(12) United States Patent
Shiobara et al.

(10) Patent No.: US 10,743,275 B2
(45) Date of Patent: Aug. 11, 2020

(54) COMMUNICATION SYSTEM AND SMALL-CELL BASE STATION

(71) Applicant: SoftBank Corp., Tokyo (JP)

(72) Inventors: Shota Shiobara, Tokyo (JP); Takao Okamawari, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 123 days.

(21) Appl. No.: 16/080,331

(22) PCT Filed: Jan. 30, 2017

(86) PCT No.: PCT/JP2017/003119
§ 371 (c)(1),
(2) Date: Aug. 28, 2018

(87) PCT Pub. No.: WO2017/150033
PCT Pub. Date: Sep. 8, 2017

(65) Prior Publication Data
US 2019/0075535 A1    Mar. 7, 2019

(30) Foreign Application Priority Data

Feb. 29, 2016  (JP) ................................ 2016-037157

(51) Int. Cl.
*H04W 56/00*   (2009.01)
*H04W 16/32*   (2009.01)
(Continued)

(52) U.S. Cl.
CPC ....... *H04W 56/0045* (2013.01); *H04W 16/28* (2013.01); *H04W 16/32* (2013.01); *H04W 28/16* (2013.01); *H04W 56/0015* (2013.01)

(58) Field of Classification Search
None
See application file for complete search history.

(56) References Cited

U.S. PATENT DOCUMENTS

| 8,767,710 B2 | 7/2014 | Chen et al. |
| 2010/0111070 A1 | 5/2010 | Hsu |

(Continued)

FOREIGN PATENT DOCUMENTS

| JP | H03-235436 A | 10/1991 |
| JP | 2012-129793 A | 7/2012 |

(Continued)

*Primary Examiner* — Saba Tsegaye
(74) *Attorney, Agent, or Firm* — Muirhead and Saturnelli, LLC

(57) ABSTRACT

A deviation of time at which downlink signals synchronously transmitted from a macro-cell base station and a small-cell base station respectively reach a communication terminal apparatus can be made within an allowable range, without being affected by transmission delay in transmission cables of base station and propagation delay in radio transmission paths. The small-cell base station is provided with a radio transceiving section connected with antenna, a radio communication control section, a transmission cable connected with the radio transceiving section and the radio communication control section, and a downlink signal receiving section for receiving downlink signals transmitted from the macro-cell base station and the own base station respectively. The small-cell base station measures a reception-timing difference of downlink signals transmitted from the macro-cell base station and the own base station based on a reception result of the downlink signal, adjusts a transmission timing of downlink signal of the own base station based on the reception-timing difference, and transmits a downlink signal at the adjusted transmission timing.

11 Claims, 11 Drawing Sheets

(51) Int. Cl.
*H04W 16/28* (2009.01)
*H04W 28/16* (2009.01)

(56) References Cited

U.S. PATENT DOCUMENTS

| | | | |
|---|---|---|---|
| 2010/0222068 A1* | 9/2010 | Gaal | H04W 56/0045 |
| | | | 455/450 |
| 2011/0188480 A1 | 8/2011 | Takagi | |
| 2012/0163299 A1 | 6/2012 | Chen et al. | |
| 2015/0131607 A1 | 5/2015 | Koorapaty et al. | |
| 2015/0223123 A1 | 8/2015 | Tomiyasu | |
| 2016/0088429 A1* | 3/2016 | Gao | G01S 5/0045 |
| | | | 455/456.1 |
| 2016/0192347 A1* | 6/2016 | Kobayashi | H04W 72/048 |
| | | | 370/329 |
| 2018/0109960 A1* | 4/2018 | Zhang | H04W 16/18 |

FOREIGN PATENT DOCUMENTS

| | | |
|---|---|---|
| JP | 2013-503533 A | 1/2013 |
| JP | 2015-146541 A | 8/2015 |

\* cited by examiner

COMMUNICATION SYSTEM AND SMALL-CELL BASE STATION

TECHNICAL FIELD

The present invention relates to a communication system and a small-cell base station.

BACKGROUND ART

A communication system is conventionally known, in which a time synchronization is performed between two or more base stations and a synchronous transmission from each of the base stations to a communication terminal apparatus is performed by matching timing of each transmission. As such technique for performing the synchronous transmission between base stations, for example, an inter-cell interference control technology in time domain (sub-frame units) is known (for example, refer to Patent Literature 1). This inter-cell interference control technology conforms to the LTE (Long Term Evolution)-Advanced standard and also called as an eICIC (enhanced Inter-Cell Interference Coordination). A CoMP (Coordinated Multiple Point) is also known, which is a technique of performing cooperative signal transmissions from tow or more neighboring base stations by matching timing of each transmission.

CITATION LIST

Patent Literature

Patent Literature 1: Japanese Unexamined Patent Application Publication No. 2012-129793.

SUMMARY OF INVENTION

Technical Problem

However, in the conventional communication system described above, a transmission delay in a transmission cable (for example, optical fiber cable from a radio communication control section (BBU: Base Band Unit) to a radio transceiving section (RRH: Remote Radio Head) of a base station apparatus) in the base station and a propagation delay in a radio transmission path from an antenna of the base station to a communication terminal apparatus are not considered. Therefore, even when the BBUs of base stations are timely synchronized and transmit signals at the same time, there is a fear that the timing of transmitting signals from the antenna of the respective base station are shifted due to the transmission delay and the propagation delay. Accordingly, for example, when applying the eICIC technology between the base stations neighboring to each other, there is a fear that the time when the signal transmitted from the antenna of each base station reaches the communication terminal apparatus is shifted more than the allowable range on the time axis and the interference cannot be suppressed.

Solution to Problem

A small-cell base station according to an aspect of the present invention is a small-cell base station that is located in a macro cell of a macro-cell base station and synchronously transmits a data to a communication terminal apparatus by matching timing with the macro-cell base station. The small-cell base station comprises a radio transceiving section connected with an antenna, a radio communication control section, a transmission cable connecting the radio transceiving section and the radio communication control section, a downlink signal receiving section that receives a downlink signal transmitted from each of the macro-cell base station and an own base station. The small-cell base station measures a reception-timing difference between downlink signals transmitted from the macro-cell base station and the own base station based on a reception result of the downlink signals, adjusts a transmission timing of downlink signal of the own base station based on the reception-timing difference, and transmits a downlink signal at the adjusted transmission timing.

In the foregoing small-cell base station, the downlink signal receiving section may measure the reception-timing difference between the downlink signal transmitted from the macro-cell base station and the own base station based on the reception result of the downlink signals, and transmit information on the reception-timing difference to the radio communication control section of the own base station, and the radio communication control section may receive the information on the reception-timing difference from the downlink signal receiving section of the own base station, adjust a transmission timing of downlink signal of the own base station based on the reception-timing difference, and control to transmit a downlink signal at the adjusted transmission timing.

In the foregoing small-cell base station, the downlink signal receiving section may measure a reception-timing difference between the downlink signals transmitted from the macro-cell base station and the own base station based on the reception result of the downlink signals, and transmit information on the reception-timing difference to the radio communication control section of the own base station, and the radio communication control section may receive the information on the reception-timing difference from the downlink signal receiving section of the own base station, calculate an offset value of the transmission timing of downlink signal of the own base station based on the reception-timing difference, adjust the transmission timing of downlink signal of the own base station based on the offset value, and control to transmit a downlink signal at the adjusted transmission timing.

In the foregoing small cell base station, the downlink signal receiving section may measure a reception-timing difference between the downlink signals transmitted from the macro-cell base station and the own base station based on the reception result of the downlink signals, calculate an offset value of the transmission timing of downlink signal of the own base station based on the reception-timing difference, and transmit information on the offset value of the transmission timing to the radio communication control section of the own base station, and the radio communication control section may receive the information on the offset value of the transmission timing from the downlink signal receiving section of the own base station, adjust the transmission timing of downlink signal of the own base station based on the offset value, and control to transmit a downlink signal at the adjusted transmission timing.

In the foregoing small cell base station, the downlink signal receiving section may be included in the radio transceiving section, and the information on the reception-timing difference or the information on the offset value of the transmission timing may be transmitted from the radio transceiving section to the radio communication control section via the transmission cable.

In the foregoing small cell base station, the small-cell base station may calculate the offset value of the transmission timing of downlink signal of the own base station based on the reception-timing difference and a cell radius of the own base station.

The foregoing small cell base station may continuously perform a reception process of the downlink signal and a measurement process of the reception-timing difference.

The small cell base station may periodically perform a reception process of the downlink signal and a measurement process of the reception-timing difference.

A communication system according to another aspect of the present invention is a communication system that comprises any one of the foregoing small-cell base stations and a macro-cell base station of a macro cell in which the small-cell base station is located.

Advantageous Effects of Invention

According to the present invention, a deviation of time at which downlink signals synchronously transmitted from a macro-cell base station and a small-cell base station respectively reach a communication terminal apparatus can be made within an allowable range, without being affected by transmission delay in transmission cables and propagation delay in radio transmission paths.

DESCRIPTION OF EMBODIMENTS

Hereinafter, various embodiments of the present invention will be described with reference to the drawings. Here, although embodiments of the present invention will be described subject to applicability to the LTE/LTE-Advanced, a concept of the present invention can be applied to any system that uses a similar cell configuration or physical channel configuration.

First, an overall configuration of a mobile communication system capable of applying the present invention will be described.

Figure 1:
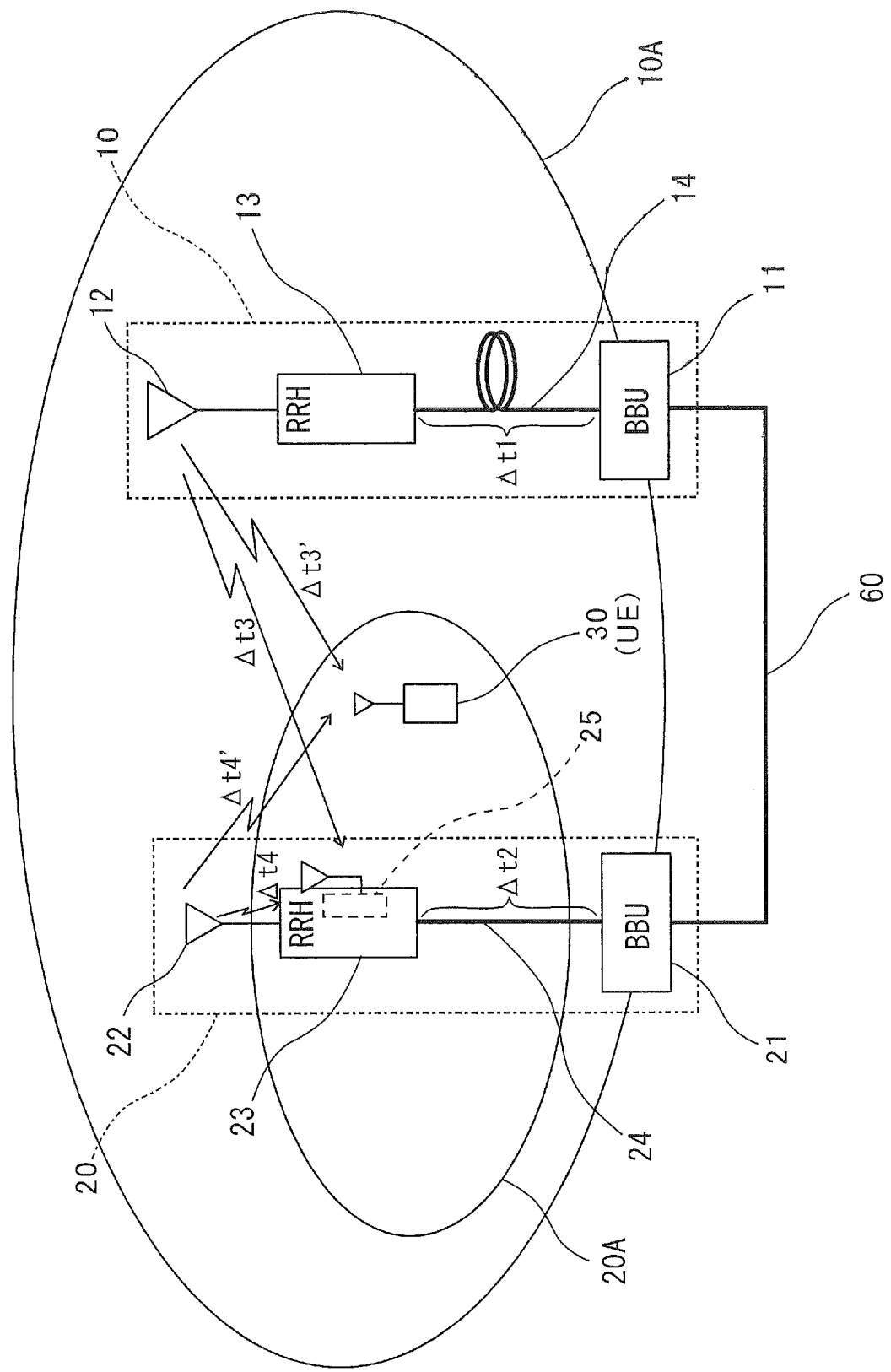
FIG. 1 is an illustration showing a schematic configuration of a mobile communication system in which a plurality of base stations is disposed according to an embodiment of the present invention.

FIG. 1 is an illustration showing a schematic configuration of a mobile communication system in which a plurality of base stations is disposed according to an embodiment of the present invention. In FIG. 1, the mobile communication system of the present embodiment is a cellular communication system based on the standard specification of LTE (Long Term Evolution)/LTE-Advanced, that is an example in which a small-cell base station 20 is located in a macro cell 10A being as a radio communication area of a macro-cell base station 10, and a small cell 20A is included in the macro cell 10A.

In FIG. 1, the macro-cell base station 10 is a base station with high output power by which covers a macro cell 10A being as a normal wide area with a radius from about several hundred meters to several kilometers in a mobile communication network, which may be referred to as "macro-cell base station", "Macro e-Node B", "Macro eNB", or the like. The small-cell base station 20 is a base station with small output power, which can be disposed indoors such as an ordinary home, shop, office, etc. and a radio communicable distance of the small-cell base station is about several meters to several hundred meters, different from the macro-cell base station 10 for wide area. Since the small-cell base station 20 is disposed so as to cover an area smaller than the area covered by the macro-cell base station 10 for wide area in the mobile communication network, the small-cell base station 20 may be referred to as "small-cell base station", "Small e-Node B", "Small eNB", or the like.

In FIG. 1, although a cell configuration in which one small cell 20A is included in one macro cell 10A is described, it may be a configuration in which two or more small cells are included in one macro cell, or a configuration in which multiple small cells are included in each of the two or more macro cells.

A user terminal apparatus (UE: User Equipment) 30, which is a mobile station as a communication terminal apparatus in mobile communication, is a user terminal apparatus connected with the small-cell base station 20 located in the cell 20A of the small-cell base station 20, and the user terminal apparatus 30 is in state capable of performing a radio communication for telephone or data communication, etc. via the small-cell base station 20. Since this user terminal apparatus 30 is located in the small cell 20A that is included in the macro cell 10, the user terminal apparatus 30 is in a situation where there is a possibility of receiving interference from the macro-cell base station 10. It is noted that, in FIG. 1, although the case where only one user terminal apparatus 30 is located in the cell is illustrated, the user terminal apparatus located in the cell may be plural. Moreover, the user terminal apparatus 30 may be connected with the macro-cell base station 10 and may be in a state capable of performing a radio communication for telephone or data communication, etc. via the macro-cell base station 10, and the user terminal apparatus 30 may be in a situation where there is a possibility of receiving interference from the small-cell base station 20.

When the user terminal apparatus 30 is located in the cell, the user terminal apparatus 30 is capable of performing a radio communication with the base stations 10 and 20 corresponding to the cell in which the user terminal apparatus is located, by using a predetermined communication system and a radio communication resource. The user terminal apparatus 30 is configured with, for example, hardware such as a computer apparatus having a CPU, a memory, etc. and radio communication section, and can perform a radio communication with the base stations 10 and 20, etc. by executing a predetermined program.

Each of the base station 10 and 20 is connected with other base stations other than the own base station, for example, via a packet network 60 using IP (Internet Protocol) or Ethernet (registered trademark) as a communication network by a wired communication line, etc., and are capable of communicating with the other base station by predetermined inter-base station communication interface such as X2 interface or the like. The communication via the packet network 60 may be, for example, an asynchronous communication. Each of the base station 10 and 20 is connected with a device (for example, EPC (Evolved Packet Core) in the LTE) on a core network side of the mobile communication network via a communication link including a line terminating equipment and a leased line, etc., and is capable of communicating with various nodes such as a server apparatus by a predetermined communication interface.

Each of the base station 10 and 20 is provided with baseband processing sections (hereinafter called as "BBU") 11 and 21 as radio communication control sections, antennas 12 and 22, remote radio heads (hereinafter called as "RRH") 13 and 23 as a radio transceiving section connected with the antenna, and transmission cables 14 and 24 such as a optical communication cable by which the BBU and the RRH are connected with each other and a transceiving signal is transmitted.

Each of the BBU 11 and 21 is configured with, for example, hardware such as a computer apparatus having a CPU, a memory, etc. and an external communication interface section, and can perform various processes so as to suppress an interference described below, generate transmission signals of various data by using a predetermined communication system and a radio communication resource, demodulate various data from the received signals, and control a radio communication with the user terminal apparatus 30, by executing a predetermined program therein.

Each of the BBU 11 and 21 functions as means of controlling so as to stop a transmission of downlink data with respect to a specific subframe of transmission stop target based on the information on the subframe of transmission stop target (called as ABS (Almost Blank Subframe) pattern information in the LTE).

Each of the RRH 13 and 23 is configured with, for example, hardware such as a computer apparatus having a CPU, a memory, etc., an external communication interface section, and a radio transceiving section, and can transmit a transmission signal and receive a reception signal with the BBUs 11 and 12, and perform a radio communication with the user terminal apparatus 30 by using a predetermined communication system and a radio communication resource, by executing a predetermined program.

The RRH 23 of the small-cell base station 20 is provided with a listening apparatus 25 as a downlink signal receiving section that receives downlink signals transmitted from the macro-cell base station 10 and the small-cell base station 20 respectively. The listening apparatus 25 is configured with, for example, a computer apparatus having a storage device such as a CPU, a memory, etc., an external communication interface section and a radio receiver, etc., and may be included in the RRH 23, or may be installed adjacent to the RRH 23 as an external device of the RRH 23. The communication between the listening apparatus 25 and the BBU 21 is performed via a transmission cable 24, and an optical fiber cable and a coaxial cable are used as the transmission cable 24.

The listening apparatus 25 also functions as means of measuring a reception-timing difference between downlink signals transmitted from the macro-cell base station 10 and the small-cell base station 20 respectively based on a result of receiving the downlink signals, and functions as means of controlling to transmit information on the reception-timing difference to the BBU 21 of the small-cell base station 20, by executing a predetermined program.

The listening apparatus 25 also functions as means of measuring a reception-timing difference of downlink signals transmitted from the macro-cell base station 10 and the small-cell base station 20 respectively based on a result of receiving the downlink signals, and functions as means of controlling to calculate an offset value for adjusting transmission timing of the downlink signal of the small-cell base station 20 based on the reception-timing difference and transmit the offset value to the BBU 21 of the small-cell base station 20, by executing a predetermined program.

The BBU 21 of the small-cell base station 20 also functions as means of controlling to receive the information on the reception-timing difference from the listening apparatus 25, calculate an offset value of transmission timing of the downlink signal of the small-cell base station 20 based on a result of measuring the reception-timing difference, store the offset value, adjust transmission timing of the downlink signal of the small-cell base station 20 based on the stored offset value, and transmit the downlink signal at the adjusted transmission timing, by executing a predetermined program.

The BBU 21 of the small-cell base station 20 also functions as means of controlling to receive the offset value of the transmission timing from the listening apparatus 25, store the offset value, adjust transmission timing of the downlink signal of the small-cell base station 20 based on the stored offset value, and transmit the downlink signal at the adjusted transmission timing, by executing a predetermined program.

Each of the BBU 11 and 12 of the base stations 10 and 20 may be provided with an internal clock and a time synchronization function between base stations. For example, each of the BBU 11 and 21 may be configured so as to function as means of performing a time synchronization process based on GPS signals received from GPS (Global Positioning System) satellites, or performing a time synchronization process (listening synchronization system) based on synchronization signals received from another reference base station, or performing a time synchronization process using a predetermined time synchronization protocol, for example, PTP (Precision Time Protocol) defined in the IEEE (The Institute of Electrical and Electronic Engineers) 1588 standard, NTP or SNTP.

Next, an inter-cell interference control will be described, to which an method of adjusting transmission timing of the downlink signal of the small-cell base station 20 in the mobile communication system with the aforementioned configuration can be effectively applied. In FIG. 1, in case that the same frequency band is used in the macro cell 10A and the small cell 20A, since an interference occurs in the small cell 20A, a control for suppressing interference is required. As this interference control method, the eICIC (enhanced Inter-Cell Interference Coordination) technology of the LTE-Advanced standard is effective.

Figure 2:
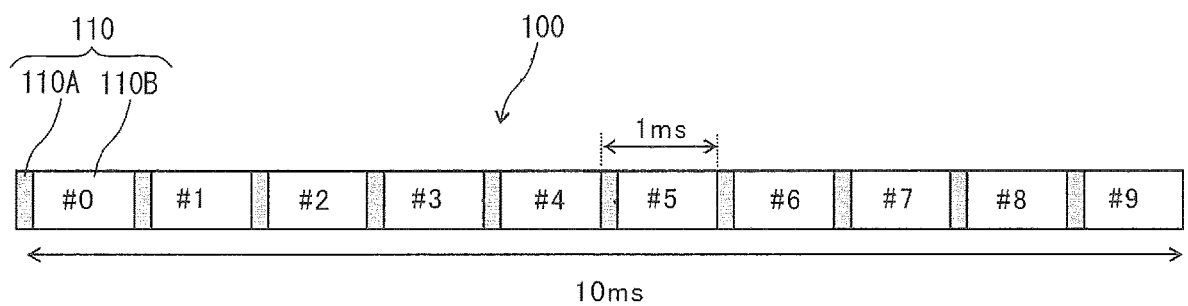
FIG. 2 is an illustration showing an example of a format of a radio communication frame of a downlink signal in a time axis direction.

FIG. 2 is an illustration showing an example of a format of a radio communication frame of a downlink signal based on the LTE/LTE-Advanced in a time axis direction. As shown in FIG. 2, a radio communication frame 100 of a predetermined length (10 [ms] in the illustrated example) that is one unit of the downlink signal is configured with a predetermined number of subframes (ten subframes in the illustrated example) 110 with a predetermined length (1.0 [ms] in the illustrated example) for each subframe. Each subframe 110 has a control channel domain 110A and a data channel domain 110B.

FIG. 3A is an illustration showing an example of a state of stopping transmission in subframes using the inter-cell interference control technology (eICIC) in state that the time synchronization between base stations is performed. As described above, a time synchronization method between base station apparatuses may be the GPS synchronization system performing a time synchronization process based on GPS signals received from GPS satellites, or the listening synchronization system performing a time synchronization process based on synchronization signals received from another reference base station, or means of performing a time synchronization process using a predetermined time synchronization protocol, for example, PTP (Precision Time Protocol) defined in the IEEE (The Institute of Electrical and Electronic Engineers) 1588 standard, NTP or SNTP.

Figure 3:
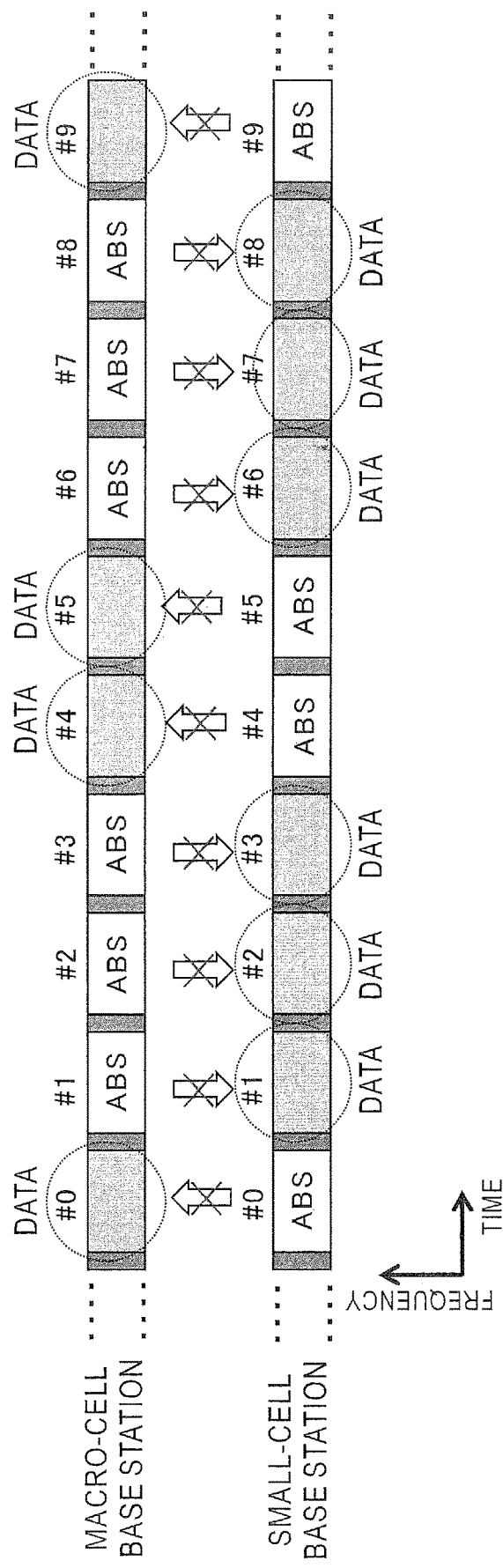
FIG. 3 is an illustration showing an example of a state of stopping transmission in subframes by ABS adopted in the inter-cell interference control technology (eICIC).

As shown in FIG. 3, in the eICIC, for example, a data transmission is stopped in some subframes (in the illustrated example, subframes of #1 to #3 and #6 to #8) within a radio communication frame transmitting from the macro-cell base station 10. Such subframes are called ABSs in the LTE. By transmitting data from the small-cell base station 20 to the user terminal apparatus 30 by using the subframes with the same subframe number as the subframes (in the illustrated example, subframes of #1 to #3 and #6 to #8) specified for the ABSs in the macro-cell base station 10, interference of the data channel from the macro-cell base station 10 in the user terminal apparatus 30 connected with the small-cell base station 20 can be reduced. Moreover, for example, as shown in FIG. 3, by similarly setting the ABSs in some subframes (in the illustrated example, subframes of #0, #4, #5 and #9) of the small-cell base station 20, by transmitting data from the macro-cell base station 10 to the user terminal apparatus by using the subframes with the same subframe number as the subframes (in the illustrated example, subframes of #0, #4, #5 and #9) specified for the ABSs in the small-cell base station 20, interference of the data channel from the small-cell base station 20 in the user terminal apparatus connected with the macro-cell base station 10 can be reduced.

Figure 4:
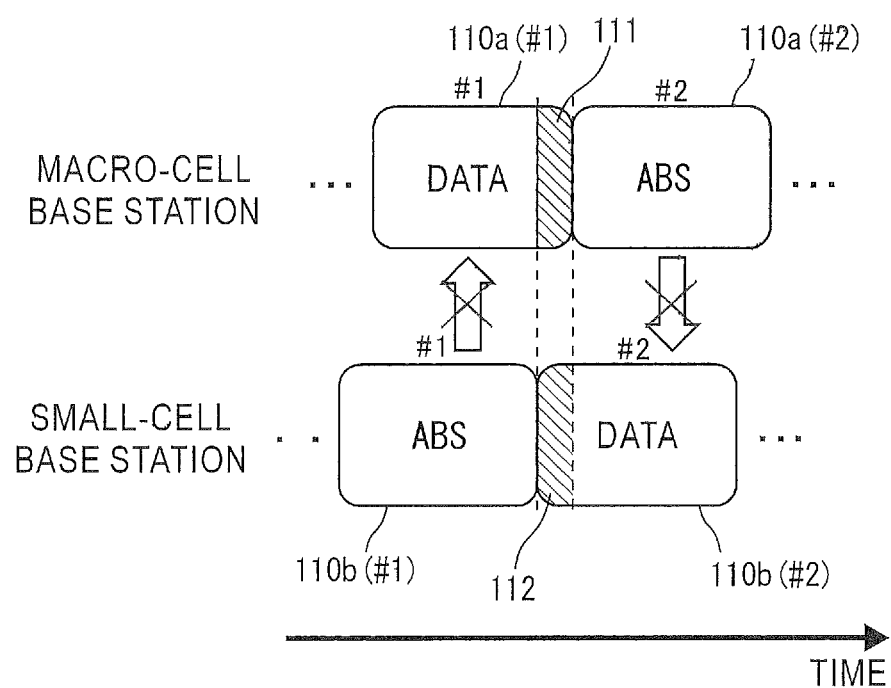
FIG. 4 is an illustration showing an example of a state of interference in case of time synchronization between base stations is incomplete.

FIG. 4 is an illustration showing an example of a state of interference in case of time synchronization between base stations is incomplete. Since the interference is controlled on the time axis in the inter-cell interference control technology (eICIC), it is necessary to make a deviation of time, at which the downlink signal transmitted from the antenna of each of the base station 10 and 20 reaches the user terminal apparatus 30, equal to or smaller than an allowable range (for example, 1 [µs] or less). If the deviation of time, at which the downlink signal transmitted from each of the base station 10 and 20 reaches the user terminal apparatus 30, is greater than the allowable range, for example, as shown in FIG. 4, a rear end portion 111 of the subframe 110a (#1) including the transmission data in just front of the subframe 110a (#2) with the ABS set at the macro-cell base station 10 and a front end portion 112 of the subframe 110b (#2) including the transmission data of the small-cell base station 20 interfere with each other. In other words, when the front end portion 112 of the subframe 110b (#2) of the downlink signal transmitted from the small-cell base station 20 is received by the user terminal apparatus 30, the rear end portion 111 of the subframe 110a (#1) of the downlink signal transmitted from the macro-cell base station 10 reaches the user terminal apparatus 30 and interferes.

However, when applying the conventional inter-cell interference control technology (eICIC), there is a case that a deviation of time (reception-timing difference) when the downlink signal transmitted from each of the base station 10 and 20 reaches the user terminal apparatus 30 is over the allowable range and a control interference on a time axis in the user terminal apparatus 30 cannot be controlled with high accuracy, even if accuracy of time synchronization between the BBUs is increased. As a result of experiments and investigations by the present inventors on the cause of low accuracy of the interference control, it was found that the accuracy of interference control is affected by a transmission delay time in the transmission cables 14 and 24 between the BBUs 11 and 21 and the RRHs 13 and 23 of the base station 10 and 20 and a propagation delay time of the radio signal (downlink signal) from the antennas 12 and 22 of the base station 10 and 20 to the user terminal apparatus 30.

Figure 5:
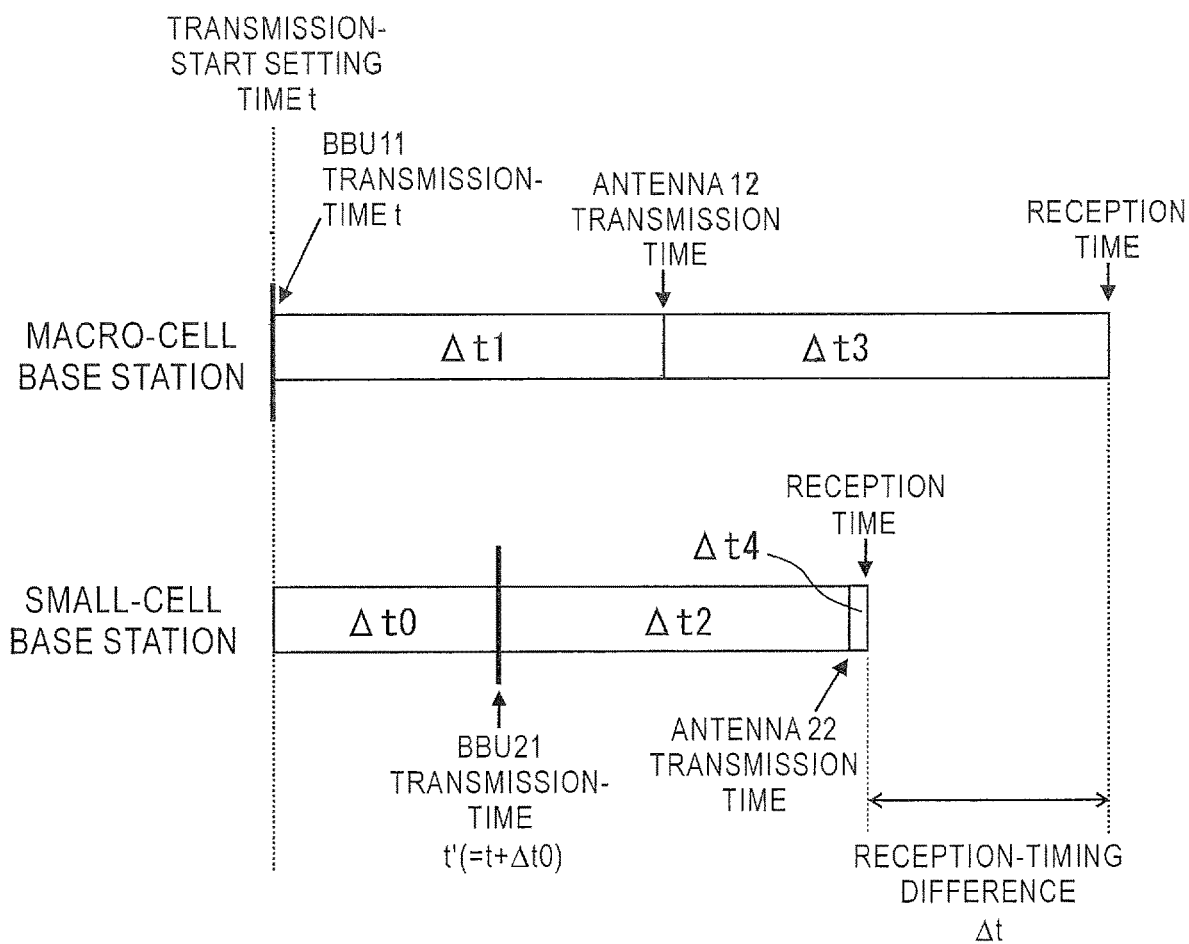
FIG. 5 is an illustration showing an example of a reception-timing difference between downlink signals transmitted from a macro-cell base station and a small-cell base station respectively, in a downlink signal receiving section.

FIG. 5 is an illustration showing an example of reception-timing difference between downlink signals transmitted from the macro-cell base station 10 and the small-cell base station 20 respectively. Here, the reception-timing difference $\Delta t$ is a deviation of time of a subframe, at which the downlink signal transmitted from each of the base station 10 and 20 reaches the listening apparatus 25. The $\Delta t0$ in the figure is a difference of the downlink signal transmission time between the BBU 11 and the BBU 21. (If the BBU 11 and the BBU 21 are timely synchronized with each other, the downlink signals can be transmitted from each BBU at the same timing, $\Delta t0=0$) The $\Delta t1$ in FIG. 5 is a transmission delay time in the transmission cable 14 from the BBU 11 to the RRH 13 of the macro-cell base station 10, and the $\Delta t2$ is a transmission delay time in the transmission cable 24 from the BBU 21 to the RRH 23 of the small-cell base station 20 (refer to FIG. 1). The $\Delta t3$ in FIG. 5 is a propagation delay time from the antenna 12 of the macro-cell base station 10 to the listening apparatus 25 of the small-cell base station side, and the $\Delta t4$ is a propagation delay time from the antenna 22 to the listening apparatus 25 of the small-cell base station 20 (refer to FIG. 1). Here, the propagation delay time $\Delta t4$ in the small cell 20A is sufficiently smaller than the $\Delta t0$, $\Delta t1$, $\Delta t2$ and $\Delta t3$ and negligible, since the listening apparatus 25 is included in the RRH 23 or installed adjacent to the RRH 23.

In FIG. 5, in the BBU 11 of the macro-cell base station 10, the downlink signal is transmitted to the RRH 13 at the timing of the predetermined transmission-start setting time t, and the downlink signal is transmitted from the antenna 12 at the timing when the transmission delay time $\Delta t1$ of the transmission cable 14 has elapsed. After that, at the timing when the propagation delay time $\Delta t3$ has elapsed, the downlink signal reaches the listening apparatus 25 and is received. On the other hand, in the BBU 21 of the small-cell base station 20, the downlink signal is transmitted to the RRH 23 at the timing t' ($=t+\Delta t0$) shifted from the predetermined transmission-start setting time t by the time lag $\Delta t0$ of the time synchronization, and the downlink signal is transmitted from the antenna 22 at the timing when the transmission delay time $\Delta t2$ of the transmission cable 24 has passed. After that, at the timing when the propagation delay time $\Delta t4$ has passed, the downlink signal reaches the listening apparatus 25 and is received. Accordingly, in the listening apparatus 25, the reception-timing difference $\Delta t$ of the downlink signal from each of the base station 10 and 20 can be expressed by the following expression (1). Moreover, when the propagation delay time $\Delta t4$ in the small cell 20A is small enough to be negligible, the reception-timing difference $\Delta t$ can be expressed by the following expression (2).

[Expression 1]

$$\Delta t = (\Delta t1 + \Delta t3) - (\Delta t0 + \Delta t2 + \Delta t4) \qquad (1)$$

[Expression 2]

$$\Delta t = (\Delta t1 + \Delta t3) - (\Delta t0 + \Delta t2) \qquad (2)$$

Here, in case that the reception-timing difference $\Delta t$ is a positive value, this case indicates that the downlink signal of the small-cell base station 20 reaches the user terminal apparatus 30 earlier than the downlink signal of the macro-cell base station 10. On the other hand, in case that the reception-timing difference $\Delta t$ is a negative value, this case indicates that the downlink signal of the small-cell base station 20 reaches the user terminal apparatus 30 later than the downlink signal of the macro-cell base station 10.

In the present embodiment, a transmission timing synchronization method between two or more base stations for adjusting a transmission start timing of the downlink signal in the BBU 21 of the small-cell base station 20 such as the following (1) to (4) is performed by considering not only the time lag $\Delta t0$ of the time synchronization but also the transmission delay time $\Delta t1$ and $\Delta t2$ and the propagation delay time $\Delta t3$ ($\Delta t4$ in some cases). It is noted that, the BBU 11 and 21 of the base station 10 and 20 may be timely synchronized ($\Delta t0=0$) with each other, or may be asynchronous ($\Delta t0 \neq 0$).

(1) The small-cell base station 20 receives the downlink signals transmitted from the macro-cell base station 10 and the small-cell base station 20 that is the own base station respectively.

(2) The small-cell base station 20 measures a reception-timing difference $\Delta t$ between the downlink signals transmitted from the macro-cell base station 10 and the small-cell base station 20 that is the own base station respectively based on a reception result of the downlink signals from the base station 10 and 20.

(3) The small-cell base station 20 adjusts the transmission timing t' of the downlink signal of the small-cell base station 20 that is the own base station based on the reception-timing difference $\Delta t$.

(4) The BBU 21 of the small-cell base station 20 transmits the downlink signal at the adjusted transmission timing t''.

Figure 6:
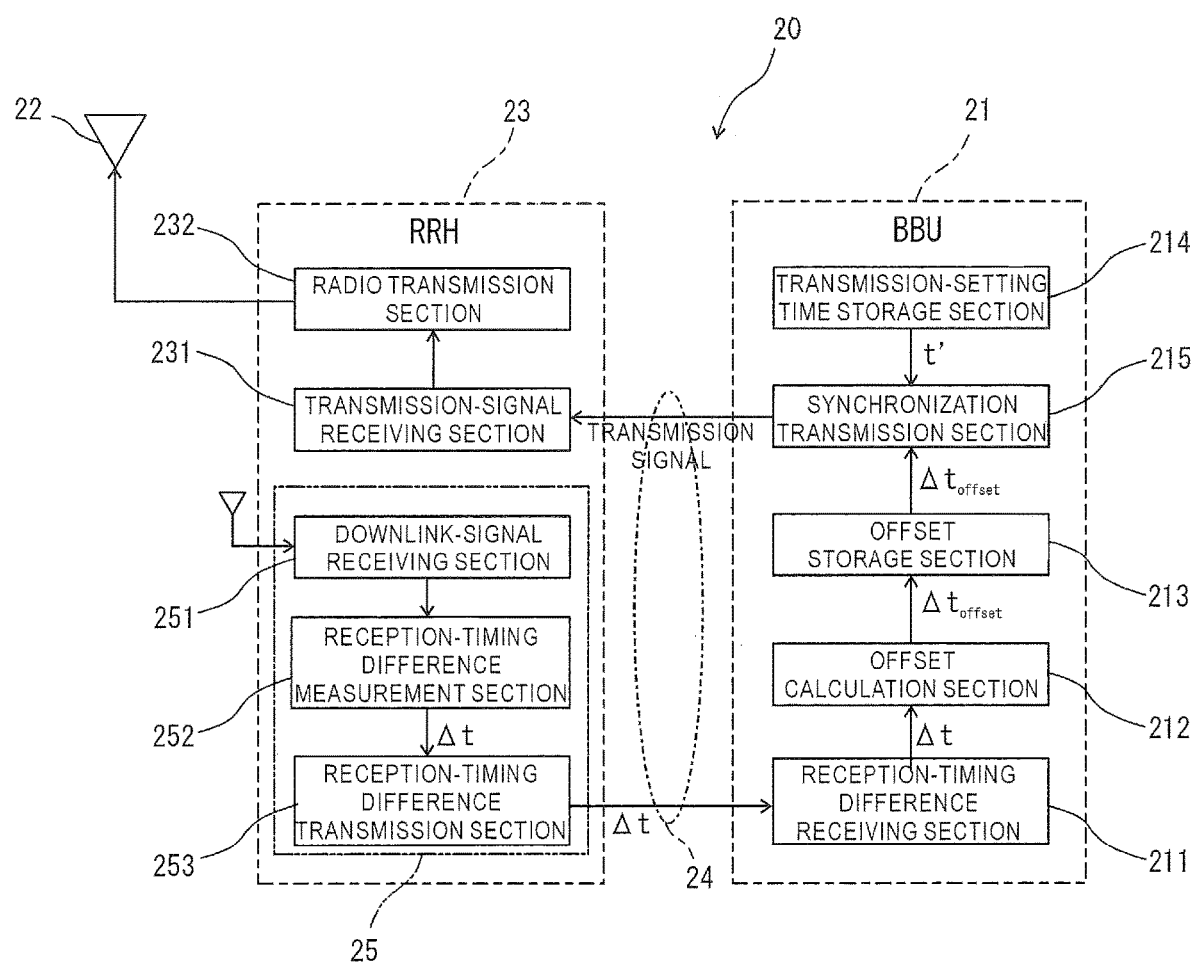
FIG. 6 is a functional block diagram showing a configuration example of a small-cell base station according to the present embodiment.

FIG. 6 is a functional block diagram showing a configuration example of the small-cell base station 20 according to the present embodiment. It is noted that, in FIG. 6, although the figure shows only the main part for realizing the transmission timing synchronization method between two or more base stations for adjusting the transmission start timing of the downlink signal of the small-cell base station 20, the base station 20 is also provided with a configuration for realizing normal functions as a base station.

In FIG. 6, the listening apparatus 25 included in the RRH 23 of the small-cell base station 20 is provided with a downlink signal receiving section 251, a reception-timing difference measurement section 252 and a reception-timing difference transmission section 253. The downlink signal receiving section 251 receives the downlink signals transmitted from the macro-cell base station 10 and the small-cell base station 20 that is the own base station, respectively. The reception-timing difference measurement section 252 measures a reception-timing difference $\Delta t$ of the downlink signals transmitted from the macro-cell base station 10 and the small-cell base station 20 that is the own base station respectively based on the reception result of the downlink signal received by the downlink signal receiving section 251. For example, the reception-timing difference measurement section 252 can measure the reception-timing difference $\Delta t$, by detecting a synchronization signal included in the received downlink signal (called as PSS (Primary Synchronization Signal), SSS (Secondary Synchronization Signal) in the LTE), and calculating the difference between the reception time of the synchronization signal received from the macro-cell base station 10 and the reception time of the synchronization signal received from the small-cell base station 20. The reception-timing difference transmission section 253 transmits the information on the reception-timing difference $\Delta t$ measured by the reception-timing difference measurement section 252 to the BBU 21 via the transmission cable 24 at the predetermined timing. In general, since the transmission cable connecting the RRH and the BBU is an optical fiber, the reception-timing difference transmission section 253 can superimpose the information on the reception-timing difference $\Delta t$ on the transceiving signal and transmit it to the BBU 21 via the transmission cable 24 at the predetermined timing, for example, by using a multiplexing technique such as a time division multiplexing (TDM) or a wavelength division multiplexing (WDM).

The BBU 21 of the small-cell base station 20 is provided with a reception-timing difference receiving section 211, an offset calculation section 212 and an offset storage section 213. The reception-timing difference receiving section 211 receives the information on the reception-timing difference $\Delta t$ transmitted from the listening apparatus 25 via the transmission cable 24. The offset calculation section 212 calculates an offset value $\Delta t_{offset}$ of the transmission timing of the downlink signal of the small-cell base station 20 that is the own base station based on the reception-timing difference $\Delta t$. The offset storage section 213 stores the offset value $\Delta t_{offset}$ calculated by the offset calculation section 212.

Here, an example of the calculation method of the offset value $\Delta t_{offset}$ in the offset calculation section 212 will be described. As shown in FIG. 1, although the user terminal apparatus 30 is located in the small cell 20A, it does not necessarily exist exactly at the same place as the place where the listening apparatus 25 is installed (that is, the place where the RRH 23 is installed). Therefore, the reception-timing difference $\Delta t$ between the downlink signal from the macro-cell base station 10 and the downlink signal from the small-cell base station 20 in the listening apparatus 25 is deferent from the reception-timing difference $\Delta t'$ in the user terminal apparatus 30. In FIG. 1, assuming the $\Delta t3'$ is a propagation delay time from the antenna 12 of the macro-cell base station 10 to the user terminal apparatus 30 locating in the small cell 20A, and the $\Delta t4'$ is a propagation delay time from the antenna 22 of the small-cell base station 20 to the user terminal apparatus 30 locating in the small cell 20A, the $\Delta t'$ is expressed by the following expression (3).

[Expression 3]

$$\Delta t' = (\Delta t1 + \Delta t3') - (\Delta t0 + \Delta t2 + \Delta t4') \quad (3)$$

Figure 7:
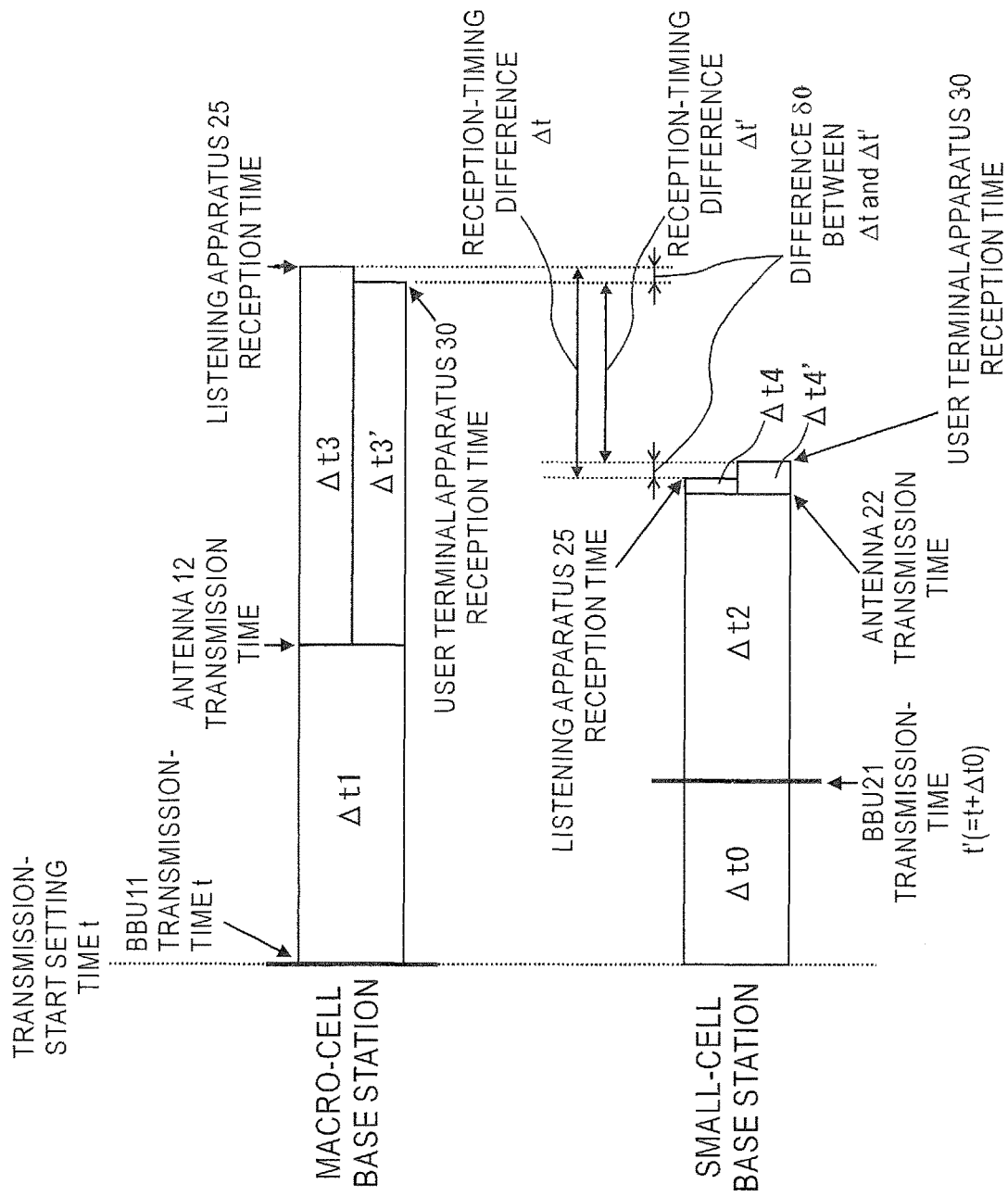
FIG. 7 is an illustration showing an example of a difference in the reception-timing differences between downlink signals transmitted from a macro-cell base station and a small-cell base station, between a downlink signal receiving section and a communication terminal apparatus.

Therefore, as shown in FIG. 7, the Δt and the Δt' are exactly different from each other by only δ0=|Δt−Δt'|. However, the radius of the small cell 20A is generally less than 100 meters. Even if the cell radius is 100 meters, the maximum value of the δ0 is about 0.7 microseconds, which is less than the allowable value of synchronization deviation of the general eICIC. Therefore, by setting $\Delta t_{offset} = \Delta t$, in the user terminal apparatus 30, it is possible to receive the downlink signal from the macro-cell base station 10 and the downlink signal from the small-cell base station 20 with sufficient synchronization accuracy. However, in case that the radius of the small cell 20A is large or the like, since the δ0 may exceed the allowable value, by using an offset value $\Delta t_{offset} = \Delta t + \delta$ in which an appropriate correction value δ is considered according to the radius or the like of the small cell 20A, the transmission with higher synchronization accuracy can be performed.

In the present embodiment, it is assumed that the radius of the small cell 20A is sufficiently small, and the listening apparatus 25 and the user terminal apparatus 30 are considered to be located at substantially the same place, the offset value is set to $\Delta t_{offset} = \Delta t$. However, when the radius of the small cell 20A is large, transmission with higher synchronization accuracy may be performed by setting $\Delta t_{offset} = \Delta t + \delta$ in consideration of an appropriate correction value δ.

The BBU 21 is provided with a transmission setting time storage section 214 and a synchronization transmission section 215. The transmission setting time storage section 214 stores a predetermined BBU 21 transmission time (transmission setting time) t' of the downlink signal that is set based on the ABS pattern or the like. The synchronization transmission section 215 starts a transmission process of the downlink signal, based on the output of the internal clock, at the timing of the adjusted BBU 21 transmission time (corrected transmission time) t" ($=t'+\Delta t_{offset}$) that is obtained by adjusting the predetermined BBU 21 transmission time (transmission setting time) t' based on the offset value $\Delta t_{offset}$ stored in the offset storage section 213, and outputs the transmission signal (baseband signal) to the RRH 23 via the transmission cable 24.

The RRH 23 of the small-cell base station 20 is provided with a transmission signal receiving section 231 and a radio transmission section 232 in addition to the listening apparatus 25. The transmission signal receiving section 231 receives the transmission signal of the downlink signal transmitted from the BBU 21 via the transmission cable 24. The radio transmission section 232 processes the transmission signal of the downlink signal received by the transmission signal receiving section 231 in a predetermined method to generate a radio signal of a predetermined frequency, and amplifies the radio signal to the desired power and outputs it to the antenna 22.

Figure 8:
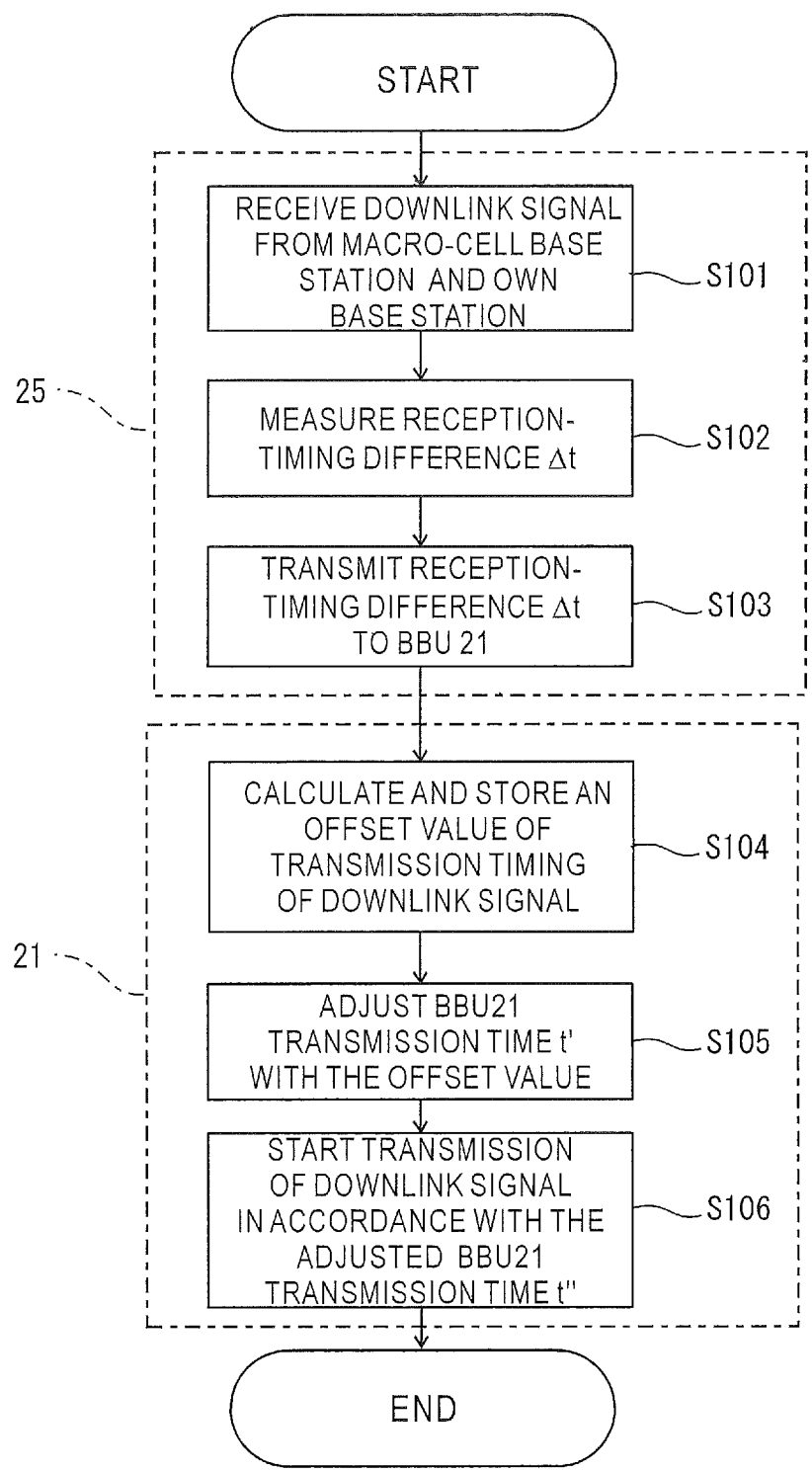
FIG. 8 is a flowchart showing an example of a process when adjusting transmission time of downlink signal in BBU of a small-cell base station of FIG. 6.

FIG. 8 is a flowchart showing an example of a process when adjusting the BBU 21 transmission time in the small-cell base station 20 of FIG. 6.

In FIG. 8, when a predetermined adjustment timing that is set in advance comes, by the listening apparatus 25, downlink signals transmitted from the macro-cell base station 10 and the small-cell base station 20 respectively are received (S101), the reception-timing difference Δt between the downlink signals transmitted from the macro-cell base station 10 and the small-cell base station 20 respectively is measured based on the reception result (S102), and the reception-timing difference Δt is transmitted to the BBU 21 (S103).

Next, by the BBU 21, the offset value $\Delta t_{offset}$ of the transmission timing of the downlink signal of the small-cell base station 20 is calculated based on the reception-timing difference Δt received from the listening apparatus 25 (S104). Furthermore, by the BBU 21, the predetermined BBU 21 transmission time (transmission setting time) t' of the downlink signal, which is set based on the ABS pattern or the like, is adjusted based on the offset value $\Delta t_{offset}$ (S105). In particular, time obtained by adding the offset value $\Delta t_{offset}$ to the initial set value of the predetermined BBU 21 transmission time (transmission setting time) t' is set as an adjusted BBU 21 transmission time (transmission correction time) t" ($=t'+\Delta t_{offset}$). Then, by the BBU 21, the transmission of downlink signal is started by matching timing to the adjusted BBU 21 transmission time (transmission correction time) t" (S106).

Since the synchronization signals are included for each radio communication frame shown in FIG. 2, the transmission timing of the macro-cell base station 10 and the small-cell base station 20 can be synchronized accurately, by continuously executing the measurement of reception-timing difference Δt shown in the flowchart of FIG. 8 every time when the synchronization signal is received. However, in order to reduce the calculation load of measuring the reception-timing difference Δt in the listening apparatus 25, the measurement of the reception-timing difference Δt may be performed at a constant cycle (for example, every time when the synchronization signal is received 128 times).

As shown in FIG. 6 and FIG. 8, by transmitting the reception-timing difference Δt measured based on the reception result of the downlink signal from the listening apparatus 25 of the small-cell base station 20 to the BBU 21, it is possible to adjust the transmission start timing of the downlink signal in the BBU 21. By adjustment of this transmission start timing, without being affected by the transmission delay in the cables 14 and 24 of the base stations 10 and 20 and the propagation delay in the radio transmission path, it is possible to make the deviation of time, at which the downlink signals synchronously transmitted from the macro-cell base station 10 and the small-cell base station 20 respectively reach the user terminal apparatus 30 in the small cell 20A, within an allowable range.

Furthermore, according to the adjustment of the transmission start timing of the downlink signal, even when there is a time synchronization deviation between the base stations 10 and 20 (when the base stations are asynchronous and Δt≠0), it is possible to make the deviation of time, at which the downlink signals synchronously transmitted from the macro-cell base station 10 and the small-cell base station 20 respectively reach the user terminal apparatus 30 in the small cell 20A, within an allowable range.

Moreover, since the small-cell base station 20 autonomously adjusts the transmission start timing of the downlink signal, there is no need to separately provide a central management apparatus for managing the transmission start timing of the downlink signal in the base station.

Figure 9:
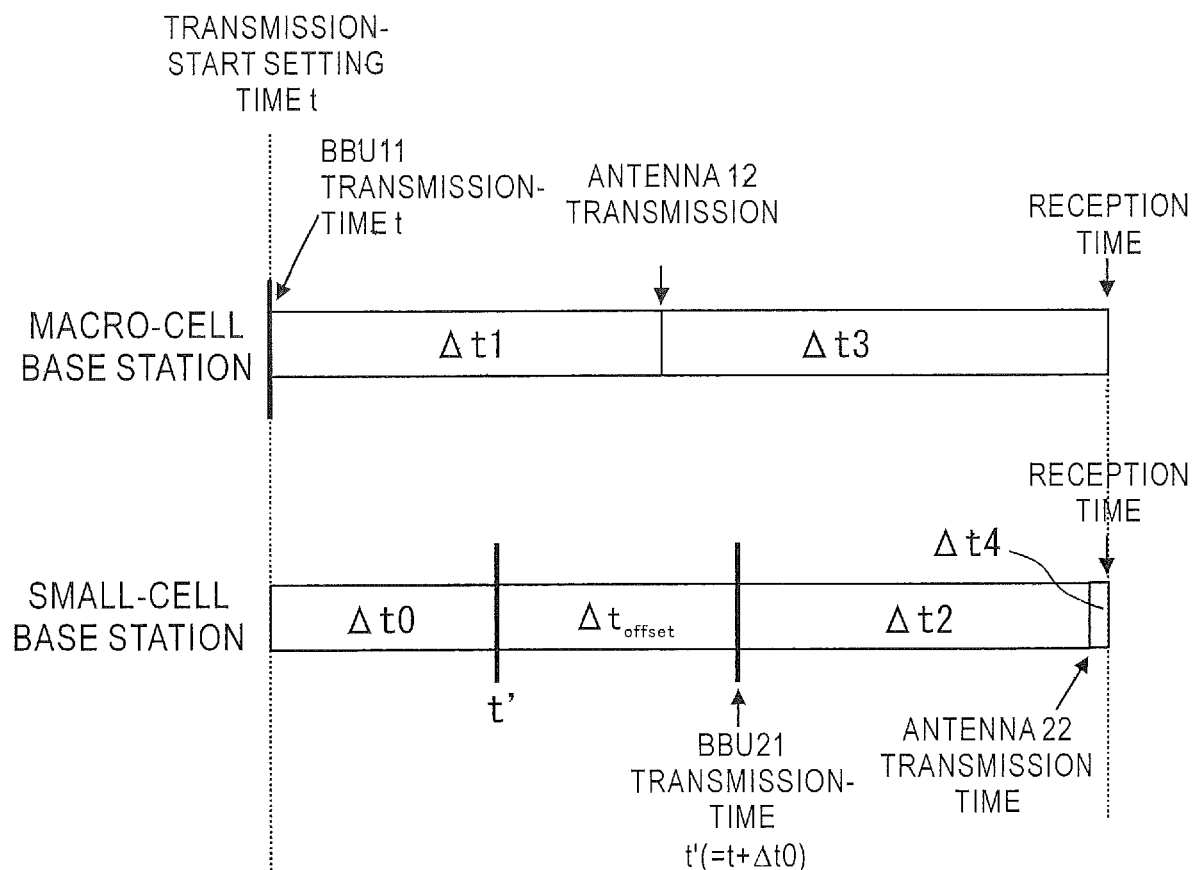
FIG. 9 is an illustration showing an example of an effect of transmitting time adjustment of downlink signal in BBU of a small-cell base station according to the present embodiment.

FIG. 9 is an illustration showing an example of an effect of adjustment of the BBU 21 transmission time in the small-cell base station 20 according to the present embodiment. As shown in FIG. 9, by starting the transmission of the downlink signal at the adjusted BBU 21 transmission time (transmission setting time) t" obtained by adding the offset value $\Delta t_{offset}$ to the initial set value of the BBU 21 transmission time (transmission setting time) t', the downlink signals synchronously transmitted from each of the base station 10 and 20 reaches the user terminal apparatus 30 almost at the same time, it is possible to make the deviation of reception time of the downlink signal within the allowable range.

Figure 10:
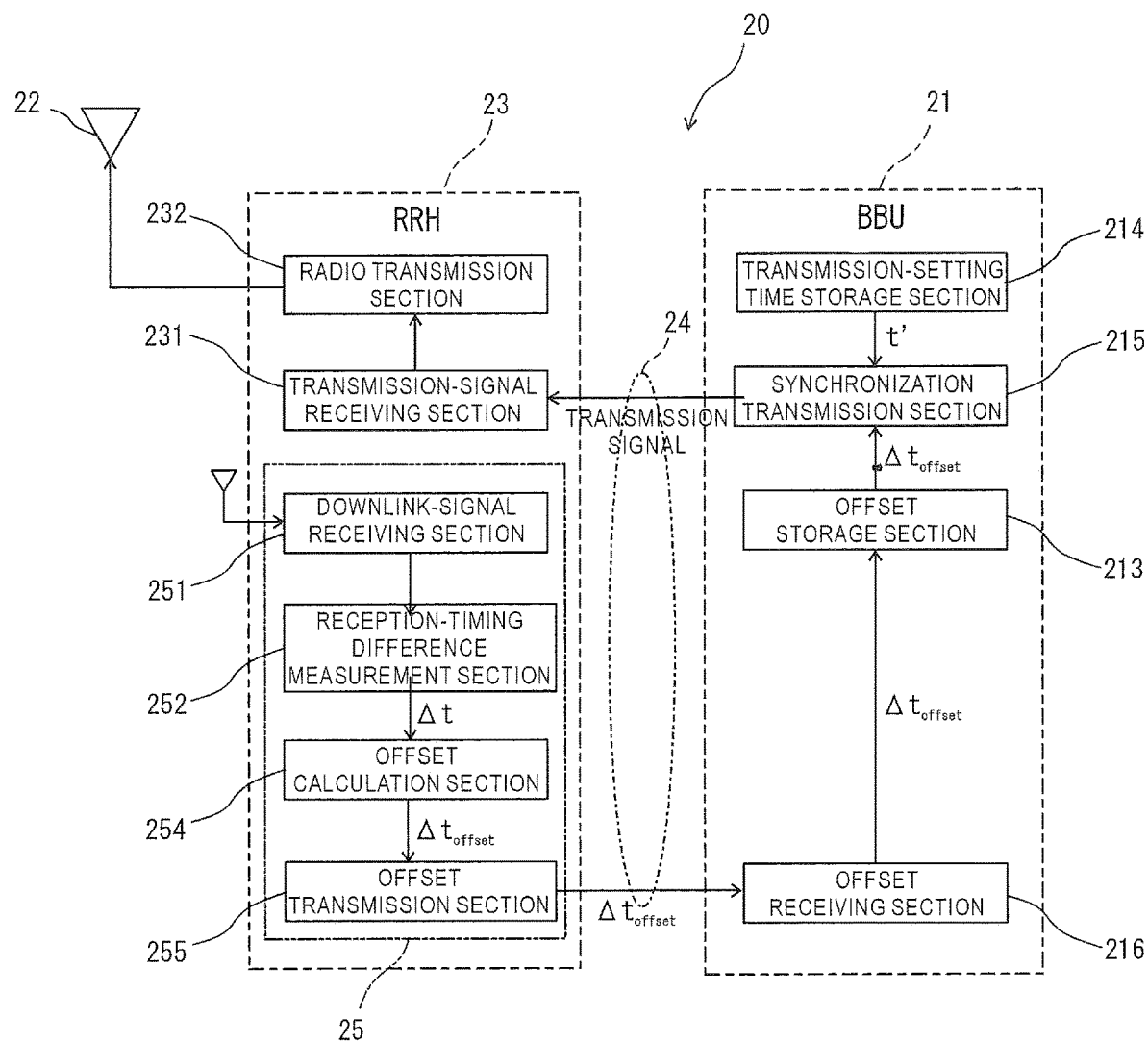
FIG. 10 is a functional block diagram showing another configuration example of a small-cell base station according to the present embodiment.

FIG. 10 is a functional block diagram showing another configuration example of the small-cell base station 20 according to the present embodiment. It is noted that, in FIG. 10, the same reference numerals are given to the same parts as in the configuration of FIG. 6 described above, the explanation thereof will be omitted.

In FIG. 10, the listening apparatus 25 is provided with an offset calculation section 254 and an offset transmission section 255, in place of the reception-timing difference transmission section 253. The offset calculation section 254 calculates the offset value $\Delta t_{offset}$ of the transmission timing of the downlink signal of the small-cell base station 20 based on the reception-timing difference $\Delta t$ measured by the reception-timing difference measurement section 252. In the present embodiment, it is assumed that that the radius of the small cell 20 is small, the listening apparatus 25 and the user terminal apparatus 30 are present at almost the same location, and the offset value is set to $\Delta t_{offset} = \Delta t$. However, when the radius of the small cell 20A is large, a transmission with higher synchronization accuracy may be performed by setting $\Delta t_{offset} = \Delta t + \delta$ in consideration of an appropriate correction value $\delta$. The offset transmission section 255 transmits the offset value $\Delta t_{offset}$ calculated by the offset calculation section 254 to the BBU 21 via the transmission cable 24.

The FIG. 10, the BBU 21 is provided with an offset receiving section 216, in place of the reception-timing difference receiving section 211 and the offset calculation section 212. The offset receiving section 216 receives the offset value $\Delta t_{offset}$ transmitted from the listening apparatus 25 via the transmission cable 24. The offset value $\Delta t_{offset}$ received by the offset receiving section 216 is stored in the offset storage section 213.

Figure 11:
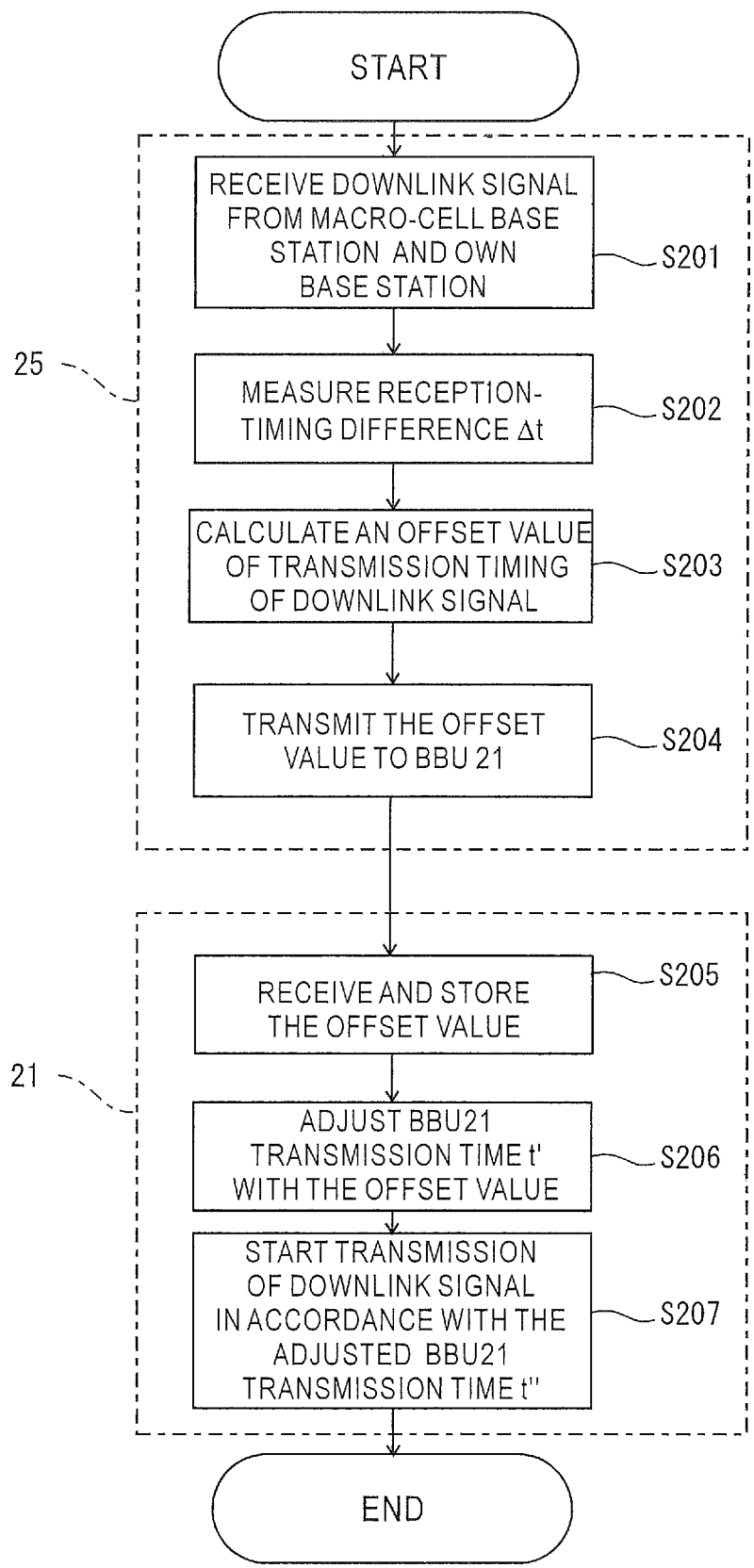
FIG. 11 is a flowchart showing an example of a process when adjusting transmission time of downlink signal in BBU of the small-cell base station of FIG. 9.

FIG. 11 is a flowchart showing an example of a process when adjusting the BBU 21 transmission time in the small-cell base station 20 of FIG. 10.

In FIG. 11, when the predetermined adjustment timing that is set in advance comes, by the listening apparatus 25, downlink signals transmitted from the macro-cell base station 10 and the small-cell base station 20 respectively are received (S201), the reception-timing difference $\Delta t$ between the downlink signals transmitted from the macro-cell base station 10 and the small-cell base station 20 respectively is measured based on the reception result (S202). Furthermore, by the listening apparatus 25, the offset value $\Delta t_{offset}$ of the transmission timing of the downlink signal of the small-cell base station 20 is calculated based on the reception-timing difference $\Delta t$ (S203), and the offset value $\Delta t_{offset}$ is transmitted to the BBU 21 (S204).

Next, the BBU 21 receives the offset value $\Delta t_{offset}$ from the listening apparatus 25 and stores the offset value $\Delta t_{offset}$. Furthermore, the predetermined BBU 21 transmission time (transmission setting time) t' of the downlink signal, which is set based on the ABS pattern or the like, is adjusted based on the offset value $\Delta t_{offset}$ by the BBU 21 (S206). In particular, time obtained by adding the offset value $\Delta t_{offset}$ to the initial setting value of the predetermined BBU 21 transmission time (transmission setting time) t' is set as the adjusted BBU 21 transmission time (transmission correction time) t" (=t'+$\Delta t_{offset}$). Then, the BBU 21 starts a transmission of downlink signal by matching timing to the adjusted BBU 21 transmission time (transmission correction time) t" (S207).

As shown in FIG. 10 and FIG. 11, by transmitting the offset value calculated based on the reception result of the downlink signal from the listening apparatus 25 of the small-cell base station 20 to the BBU 21, it is possible to adjust the transmission start timing of the downlink signal at the BBU 21. By the adjustment of transmission start timing, it is possible to make the deviation of time, at which the downlink signals synchronously transmitted from the macro-cell base station 10 and the small-cell base station 20 respectively reach the user terminal apparatus 30 in the small cell 20A, within an allowable range, without being affected by the transmission delay in the transmission cables 14 and 24 of the base stations 10 and 20 and the propagation delay in the radio transmission path.

Furthermore, according to the adjustment of the transmission start timing of the downlink signal, even if in case that there is a deviation of time synchronization between the base stations 10 and 20 (in case of asynchronous between base stations), it is possible to make the deviation of time, at which the downlink signals synchronously transmitted from the macro-cell base station 10 and the small-cell base station 20 respectively reach the user terminal apparatus 30 in the small cell 20A, within an allowable range. Moreover, since the small-cell base station 20 autonomously adjusts the transmission start timing of the downlink signal, there is no need to separately provide a central management apparatus for managing the transmission start timing of the downlink signal in the base station.

In the present embodiment, in case that the radius of the small cell 20A is large and it is necessary to consider an appropriate correction value σ, the offset calculation section shown in FIG. 6 and FIG. 10 calculates the correction value σ based on, for example, the reception-timing difference $\Delta t$ measured by the listening apparatus 25 and the radius of the small cell 20A or the like. Then, a transmission with higher synchronization accuracy can be also performed, by using the offset value $\Delta t_{offset}$ $\Delta t+σ$) of the transmission timing of the downlink signal.

It is noted that, in the present embodiments, the number of the small-cell base stations located in the macro cell 10A of the macro-cell base station 10 may be two or more, or three or more. In this case, each of the two or more small-cell base stations is configured similarly to the small-cell base station 20 shown in FIG. 1 to FIG. 11, and autonomously adjusts the transmission start timing of the downlink signal. Accordingly, it is possible to make the deviation of time, at which the downlink signals synchronously transmitted from the macro-cell base station 10 and the two or more small-cell base stations respectively reach the user terminal apparatuses in each small cell, within an allowable range, without being affected by the transmission delay in the transmission cables 14 and 24 of the macro-cell base station 10 and the two or more small-cell base stations respectively and the propagation delay in the radio transmission path.

Furthermore, even in case that there is a time synchronization deviation between the macro-cell base station 10 and the two or more small-cell base stations (in case of asynchronous between the base stations and t≠0), it is possible to make the deviation of time, at which the downlink signals synchronously transmitted from the macro-cell base station 10 and the two or more small-cell base stations respectively reach the user terminal apparatuses in each small cell, within an allowable range.

Moreover, since each of the two or more small-cell base stations autonomously adjusts the transmission start timing of the downlink signal, there is no need to separately provide a central management apparatus that manages transmission start timing of the downlink signal in the plurality of small-cell base stations.

In the present embodiments, the small-cell base station 20 may continuously perform the reception process of the downlink signal and the measurement process of the reception-timing difference. Also, the small-cell base station 20 may periodically perform the reception process of the downlink signal and the measurement processes of the reception-timing difference at predetermined time intervals.

Moreover, in the present embodiments, although it is described on the assumption that applied to the LTE/LTE-Advanced, the concept of the present invention can be applied to any radio communication system, further, it is not limited to the configuration of the base station shown in the present embodiment.

Further, the process steps and configuration elements in the mobile communication system, the base station and the user terminal apparatus (mobile station) described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, terminal, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 macro-cell base station
10A macro cell
11 BBU, baseband processing section (radio communication control section)
12 antenna
13 RRH, remote radio head (radio transceiving section)
14 transmission cable
20 small-cell base station
20A small cell
21 BBU, baseband processing section (radio communication control section)
23 RRH, remote radio head (radio transceiving section)
24 transmission cable
25 listening apparatus
30 user terminal apparatus (communication terminal apparatus, mobile apparatus, mobile station)
60 communication network between base stations
211 reception-timing difference receiving section
212 offset calculation section
213 offset storage section
214 transmission-setting time storage section
215 synchronization transmission section
216 offset receiving section
231 transmission-signal receiving section
232 radio transmission section
251 downlink-signal receiving section
252 reception-timing difference measurement section
253 reception-timing difference transmission section
254 offset calculation section
255 offset transmission section

The invention claimed is:

1. A small-cell base station that is located in a macro cell of a macro-cell base station and synchronously transmits a data to a communication terminal apparatus by matching timing with the macro-cell base station, comprising:
a radio transceiving section connected with an antenna;
a radio communication control section;
a transmission cable connecting the radio transceiving section and the radio communication control section; and
a downlink signal receiving section receives downlink signals transmitted from the macro-cell base station and an own base station respectively, and
wherein the small-cell base station measures a reception-timing difference between downlink signals transmitted from the macro-cell base station and the own base station based on a reception result of the downlink signals, adjusts a transmission timing of downlink signal of the own base station based on the reception-timing difference, and transmits a downlink signal at the adjusted transmission timing,
wherein the downlink signal receiving section:
measures a reception-timing difference between the downlink signals transmitted from the macro-cell base station and the own base station based on the reception result of the downlink signals; and transmits information on the reception-timing difference to the radio communication control section of the own base station, wherein the radio communication control section:

receives the information of the reception-timing difference from the downlink signal receiving section of the own base station, calculates an offset value of the transmission timing of downlink signal of the own base station based on the reception-timing difference;

adjusts the transmission timing of downlink signal of the own base station based on the offset value; and controls to transmit the downlink signal at the adjusted transmission timing, and wherein the small-cell base station calculates the offset value of the transmission timing of downlink signal of the own base station based on the reception-timing difference and a cell radius of the own base station.

2. The small-cell base station according to claim 1, wherein the downlink signal receiving section is included in the radio transceiving section, and wherein the information on the reception-timing difference or the information on the offset value of the transmission timing is transmitted from the radio transceiving section to the radio communication control section via the transmission cable.

3. The small-cell base station according to claim 1, wherein the small-cell base station continuously performs a reception process of the downlink signal and a measurement process of the reception-timing difference.

4. The small-cell base station according to claim 1, wherein the small-cell base station periodically performs a reception process of the downlink signal and a measurement process of the reception-timing difference.

5. A communication system, comprising:
a small-cell base station according to claim 1, and
a macro-cell base station of a macro cell in which the small-cell base station is located.

6. The small-cell base station according to claim 1, wherein the downlink signal receiving section is included in the radio transceiving section, and wherein the information on the reception-timing difference or the information on the offset value of the transmission timing is transmitted from the radio transceiving section to the radio communication control section via the transmission cable.

7. A small-cell base station that is located in a macro cell of a macro-cell base station and synchronously transmits a data to a communication terminal apparatus by matching timing with the macro-cell base station, comprising:

a radio transceiving section connected with an antenna;
a radio communication control section;
a transmission cable connecting the radio transceiving section and the radio communication control section; and a downlink signal receiving section receives downlink signals transmitted from the macro-cell base station and an own base station respectively, and wherein the small-cell base station measures a reception-timing difference between downlink signals transmitted from the macro-cell base station and the own base station based on a reception result of the downlink signals, adjusts a transmission timing of downlink signal of the own base station based on the reception-timing difference, and transmits a downlink signal at the adjusted transmission timing, wherein the downlink signal receiving section:

measures a reception-timing difference between the downlink signals transmitted from the macro-cell base station and the own base station based on the reception result of the downlink signal;

calculates an offset value of the transmission timing of downlink signal of the own base station based on the reception-timing difference; and transmits information on the offset value of the transmission timing to the radio communication control section of the own base station, wherein the radio communication control section:

receives the information on the offset value of the transmission timing from the downlink signal receiving section of the own base station;

adjusts the transmission timing of downlink signal of the own base station based on the offset value; and controls to transmit the downlink signal at the adjusted transmission timing, and wherein the small-cell base station calculates the offset value of the transmission timing of downlink signal of the own base station based on the reception-timing difference and a cell radius of the own base station.

8. The small-cell base station according to claim 7, wherein the downlink signal receiving section is included in the radio transceiving section, and wherein the information on the reception-timing difference or the information on the offset value of the transmission timing is transmitted from the radio transceiving section to the radio communication control section via the transmission cable.

9. The small-cell base station according to claim 7, wherein the small-cell base station continuously performs a reception process of the downlink signal and a measurement process of the reception-timing difference.

10. The small-cell base station according to claim 7, wherein the small-cell base station periodically performs a reception process of the downlink signal and a measurement process of the reception-timing difference.

11. A communication system, comprising:
a small-cell base station according to claim 7, and
a macro-cell base station of a macro cell in which the small-cell base station is located.

* * * * *